Oct. 21, 1969  J. C. VAIDEN  3,473,760
SOLID STATE CONTROL WHEEL HUB FORCE SENSOR FOR CONTROL OF
AN AIRCRAFT AND OPERATIVE TO MODIFY AN AUTOMATIC
PILOT CONTROL SYSTEM FOR THE AIRCRAFT
Filed March 4, 1968  5 Sheets-Sheet 2

INVENTOR.
JOHN C. VAIDEN
BY  *Herbert L. Davis*
ATTORNEY

INVENTOR.
JOHN C. VAIDEN

ATTORNEY

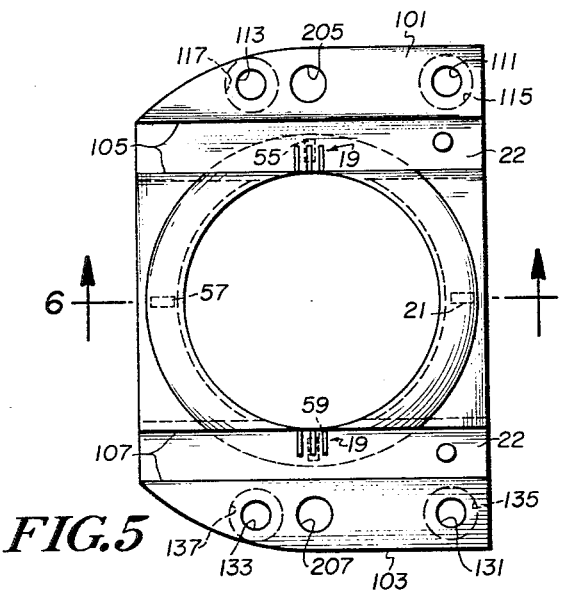
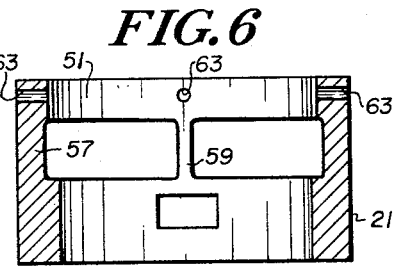
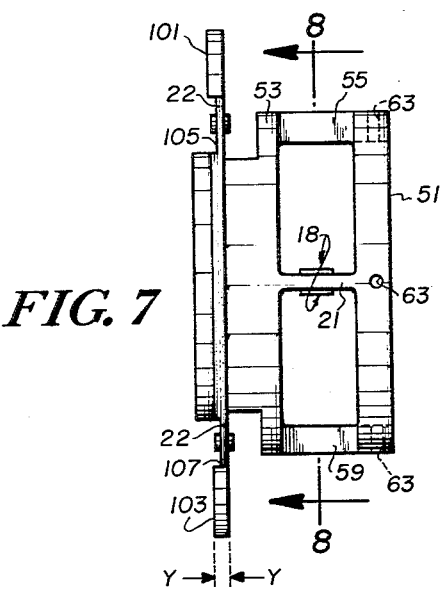
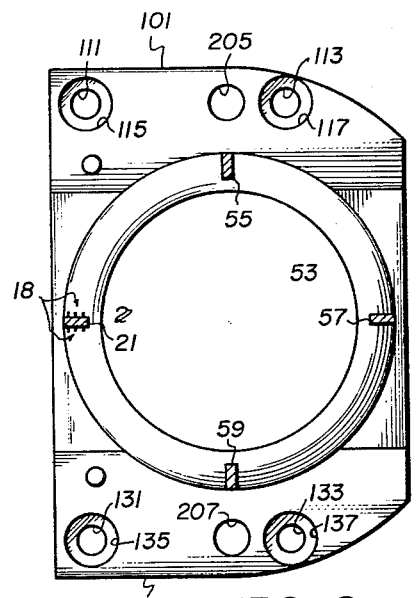
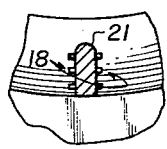

INVENTOR.
JOHN C. VAIDEN

ATTORNEY

United States Patent Office 3,473,760
Patented Oct. 21, 1969

1

3,473,760
SOLID STATE CONTROL WHEEL HUB FORCE SENSOR FOR CONTROL OF AN AIRCRAFT AND OPERATIVE TO MODIFY AN AUTOMATIC PILOT CONTROL SYSTEM FOR THE AIRCRAFT
John C. Vaiden, Wayne, N.J., assignor to The Bendix Corporation, a corporation of Delaware
Filed Mar. 4, 1968, Ser. No. 710,164
Int. Cl. B64c *13/12;* H01v *7/00*
U.S. Cl. 244—83                                    10 Claims

ABSTRACT OF THE DISCLOSURE

A control wheel hub force sensor including a pair of spring members orthogonal to one another with semiconductor strain gages mounted on orthogonal spring members to provide signals corresponding to the flexure of the associated spring member by a control wheel to effect control of the aircraft in pitch and roll senses. The strain gages on such orthogonal spring member may be connected in a bridge circuit to differentially unbalance the bridge and provide an electrical output corresponding to the forces applied to the spring member in said pitch and roll senses to modify an automatic pilot control system.

CROSS-REFERENCE TO RELATED APPLICATIONS

The present invention relates to improvements in a Solid State Force Sensor For Control Instruments of a type such as disclosed and claimed in a copending U.S. application Ser. No. 616,067, filed Feb. 14, 1967 by Raymond D. Palfreyman.

BACKGROUND OF THE INVENTION

Field of the invention

This invention relates to the aircraft control field and more particularly to a control wheel force transducer means for sensing the flexure of a control wheel in pitch and roll senses to modify an automatic pilot control system for the aircraft.

Description of the prior art

Heretofore, control sticks and control wheels for manually controlling aircraft have used synchros or relatively movable core transformers for detecting displacement of the control stick or control wheel as disclosed and claimed in U.S. Reissue Patent No. 25,356 granted Mar. 19, 1963 to Robert E. Feucht, John Jarvis and John C. Ziegler; U.S. Patent No. 3,057,585 granted Oct. 9, 1962 to John C. Ziegler, Lucien R. Beauregard and Harry Langer; and U.S. Patent No. 3,119,580 granted Jan. 28, 1964 to Norman B. Murphy and all of which patents have been assigned to The Bendix Corporation.

In such prior controls, it was found that relative movement of the rotor and stator of the synchro or movement of the core relative to the windings of the transformer was accompanied by internal friction and hysteresis which introduced erroneous measurement. Further, redundance in such systems is not practical if minimum weight and size is desired.

In an effort to overcome the difficulties encountered in such prior control devices there have been heretofore utilized solid state strain gages attached to a control element of a control stick to detect pilot applied forces on the control element about two orthogonal axes as disclosed and claimed in the copending U.S. application Ser. No. 616,067 filed Feb. 14, 1967 by Raymond D. Palfreyman and assigned to The Bendix Corporation.

2

In such prior control stick arrangement, there has been provided a control element having a pair of spring sections orthogonal to one another to detect forces applied to the control element about two mutually perpendicular axes. At least one strain gage is preferably mounted on each side of a spring section to simultaneously detect the compression and tension of the spring section. The strain gages associated with each spring section are connected in a Wheatstone bridge to differentially unbalance the bridge when the spring section flexes so as to provide an output corresponding to the force applied to the spring section of the control element. Such arrangement in the control stick relates to distinctly different problems from those to which the present invention are directed.

SUMMARY OF THE INVENTION

In instrumenting a control wheel hub, as in the present invention, to generate electrical signals corresponding to forces applied about two different axes two problems immediately appear; (1) how to accommodate the requirement that the pilot be able to apply forces to the control wheel with either or both hands without introducing signal errors related to point of force application on the control wheel and (2) how to avoid generating pitch responses to roll forces and vice-versa. Current production control wheel hub force sensor designs, such as disclosed in the aforenoted U.S. Patent No. 3,119,580 granted Jan. 28, 1964 to Norman B. Murphy, utilize cylindrical race ball bearings to cancel the undesired twisting couples, which are at the heart of the problem, but through the arrangement of the strain gage transducer in the control wheel hub of the present invention the use of such ball bearings are unnecessary.

In the present invention, in order to facilitate the sensing of the forces applied by the pilot to the control wheel in a roll axis sense, there are provided two rings operably connected by four rectangular leaf springs so that the rotation of one ring relative to the other deflects the springs in bending with one of the four springs being instrumented with semiconductor strain gages applied at each side and interconnected into an electrical bridge such that axial strains cancel out, but bending strains augment so as to render such strain gages of the hub force sensor responsive only to roll controlling forces applied to the control wheel. Thus the arrangement is such that axial strains applied to the control wheel in a pitch sense and apparent strains from temperature changes are self-cancelling with respect to the strain gages applied to the rectangular leaf spring connecting the two rings. Moreover, in the subject invention, one of these two interconnected rings is fastened to a splined adapter which then is secured to a shaft rotatably mounted in the control column, while the other ring has two flanged sections operably connected to a plate supporting the control wheel.

Further in the present invention, in order to facilitate the sensing of the forces applied by the pilot to the control wheel in a pitch axis sense, the two flanged sections of said other ring are formed with two reduced thickness sections, one in each of the flanged sections projecting from opposite sides of said other ring in an arrangement in which the two reduced thickness sections function as two rectangular leaf springs.

The sections of the flanges beyond the reduced thickness spring sections are interconnected by the plate supporting the control wheel so that the reduced thickness rectangular leaf spring sections deflect in conjunction with each other so that if equal forces are applied to the control wheel in like senses the reduced thickness rectangular leaf spring sections deflect equally in the same direction, while if a force is applied to the control wheel at one side in a pitch sense the reduced thickness spring section at said one side will deflect in a corresponding direction to the applied force, while the opposite reduced thickness spring section will deflect to a lesser amount in an opposite direction. In such case the difference in such deflection is proportional to the applied forces, while the magnitude of the deflection will vary as a function of the moment arm.

Further in the aforenoted arrangement, the reduced thickness rectangular leaf spring sections are instrumented with semiconductor strain gages applied at each side of the reduced thickness spring sections and interconnected into an electrical bridge which combines the electrical signals to provide a resultant output signal proportional to the differences in strain. Here again the strain gages are placed at each side of the reduced thickness spring sections to offset apparent strains from temperature changes and tensile strains due to restraints. Moreover in the aforenoted arrangement, the proportions of the reduced thickness spring sections are so chosen that there is negligible response to forces about axes other than the pitch axis and the pitch axis strain gages are located in a neutral axis of twisting modes of deflection.

The hub sensor of the present invention overcomes cross coupling between the forces applied to the control wheel in roll and pitch senses by arranging the axes about which these forces are applied so that one of the spring members flexes about a first axis in a roll sense while the other spring member is rigid about a second or pitch axis orthogonal thereto. The other spring member flexes when a force is applied in a pitch sense about the second or pitch axis while the first mentioned spring member is rigid upon the force being applied in the second or pitch sense about the second axis at right angles to the first or roll axis.

An object of the present invention, therefore, is to provide a hub of a control wheel having strain gages arranged to sense forces applied to the control wheel in one or the other of orthogonal pitch and roll senses.

A further object of the invention is to provide a hub force sensor means to sense forces applied to a control wheel of an aircraft by either or both hands of a pilot without introducing signal errors related to the point of force application on the control wheel.

Another object is to sense forces applied to a control wheel about two orthogonal axes without undesired twisting couples tending to introduce signal errors generating pitch responses to roll forces or vice-versa.

A further object of the invention is to provide a control wheel including a hub force sensor means, including rectangular leaf spring members in orthogonal relationship and semiconductor strain gages mounted thereon wherein a force about one axis does not cause an appreciable flexure about an orthogonal axis.

A further object of this invention is to provide a compact hub force sensor means, including redundancy in measuring the force applied to a control wheel of an aircraft in pitch and roll control senses.

Another object of the invention is to provide in a control wheel a hub force sensor, including radial rectangular leaf springs which deflect torsionally in response to roll control forces and other rectangular leaf springs which deflect axially in response to pitch control forces with certain of said rectangular leaf springs including semiconductor strain gages having piezo-resistive characteristics such that small changes in strain cause large changes in the resistance of the gages mounted on the rectangular leaf springs with the semiconductor strain gages being connected in suitable control circuitry so as to provide separate electrical signals corresponding to the respective sensed roll and pitch controlling force inputs.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts:

FIGURE 5 is an end view of a hub force sensor plate showing the relative location of the strain gages in channels of the pitch axis sensor and at one side of the rectangular leaf springs defined by the channels.

FIGURE 6 is a sectional view of a hub portion of the force sensor plate of FIGURE 5 taken along the lines 6—6 and looking in the direction of the arrows.

FIGURE 7 is a top plan view of the hub force sensor plate of FIGURE 5 and illustrating the relative locations of the pitch and roll sensor strain gages on opposite sides of the respective pitch and roll rectangular leaf springs.

FIGURE 8 is a sectional view of the hub portion of the sensor plate of FIGURE 7 taken along the lines 8—8 and looking in the direction of the arrows.

FIGURE 9 is an enlarged fragmentary view of the lower radial leaf spring of the hub portion of the force sensor of FIGURE 8 and illustrating the relative locations of the strain gages on opposite sides of the roll axis sensor rectangular leaf spring.

DESCRIPTION OF A PREFERRED EMBODIMENT

Figure 1:
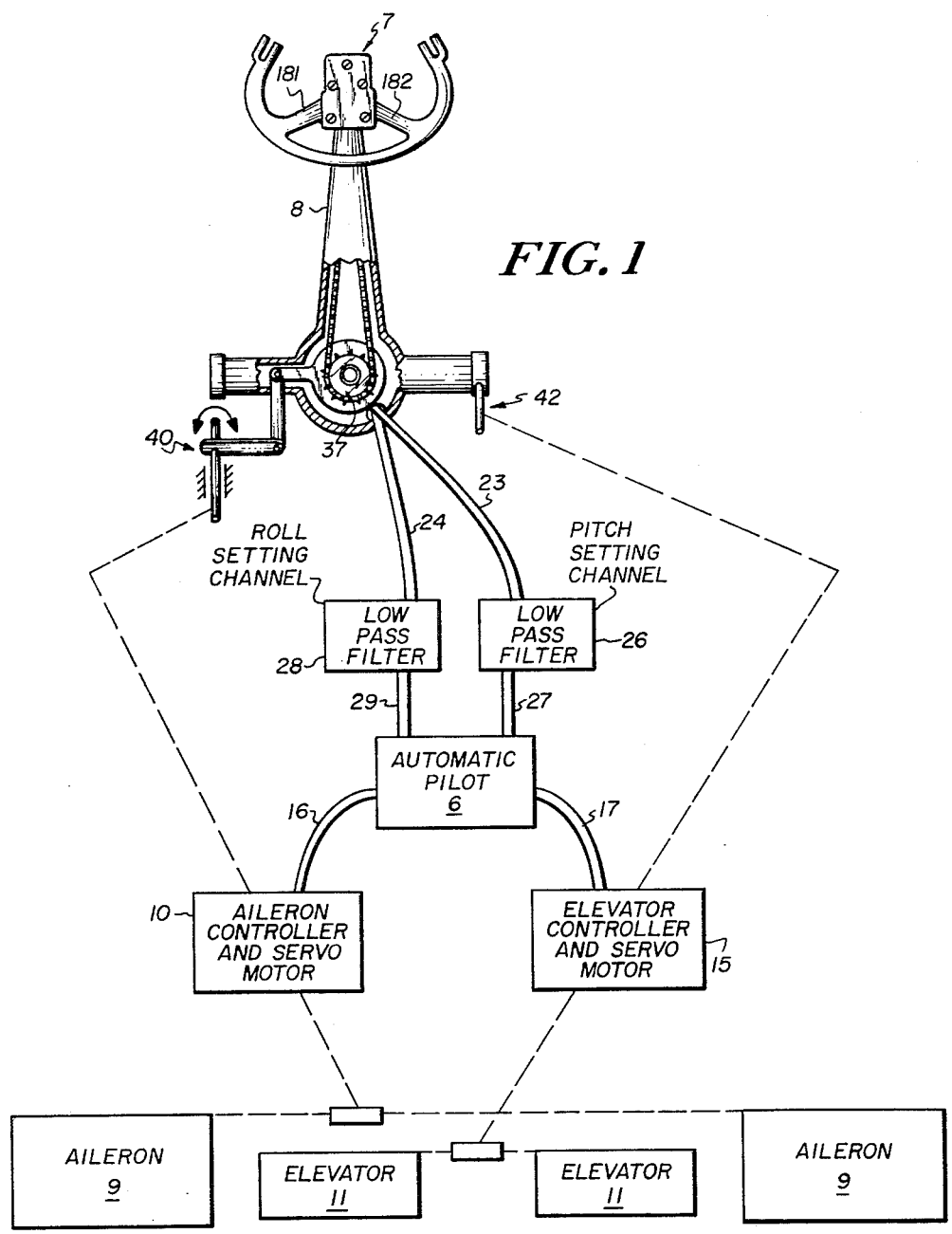
FIGURE 1 illustrates schematically a control wheel and column assembly embodying the present invention and shown in an operative relation in a control system in which the invention is designed for use.

Referring to the drawing of FIGURE 1, there is shown schematically a control system such as disclosed and claimed in the aforenoted U.S. Reissue Patent No. 25,356, granted Mar. 19, 1963, and in which system the improved control wheel of the present invention may be used. In the aforenoted system, the control surfaces of an aircraft may be operated automatically by an automatic pilot system denoted generally at 6 or manualy controlled by the improved control wheel 7 forming the subject matter of the invention and resiliently mounted in a control column 8.

The manual control wheel 7 is mounted for angular movement relative to the control column 8 so that angular displacements thereof effectively control ailerons 9 through operation of a suitable controller and servo motor 10, as indicated diagrammatically in the drawing of FIGURE 1, while fore and aft displacements of the control column 8 in turn effectively control elevators 11 through operation of a suitable controller and servo motor designated by the numeral 15.

Similarly as disclosed in the aforenoted U.S. Reissue Patent No. 25,356, pitch and roll sensing devices operating in the automatic pilot 6 apply electrical signals through conduits 16 and 17 to motors 10 and 15 so as to effect operation of the elevators 11 and ailerons 9 to provide the desired controlling action.

Upon an application to the manual control wheel 7 of a force in excess of a predetermined value, the deflective movement of the control wheel 7 is effective to cooperate with the steering shaft or control column, as explained hereinafter, to impart a force to override the operation of the controllers and servo motors 10 and 15 by the automatic pilot 6 and render the manual control wheel 7 effective to control the operation of the ailerons and elevators 9 and 11 through the controllers and servo motors 10 and 15 which may be of the type shown in FIGURE 4 of the aforenoted U.S. Reissue Patent No. 25,356, and explained therein.

IMPROVED CONTROL WHEEL HUB FORCE SENSOR

In accordance with the present invention, there is provided an improved force translation means including electrical semiconductor strain gages 18 and 19 mounted exteriorly of the control column 8 and adjacent rectangular leaf spring elements of a hub force sensor 20 of the control wheel 7.

As shown by FIGURES 2, 3, 7, 8 and 9, semiconductor strain gages 18 are attached to one side of a roll axis control force sensing leaf spring 21 while similar strain gages 18 are attached to the opposite side of the roll axis force sensing rectangular leaf spring 21. Similarly, as shown by FIGURES 4, 5 and 7, semiconductor strain gages 19 are attached to one side of pitch axis control force sensing rectangular leaf spring 22 while similar strain gages 19 are attached to the opposite side of the rectangular leaf spring 22. The strain gages 18 and 19 are secured to the leaf springs 21 and 22, respectively, by suitable bonding means, such as a suitable epoxy adhesive. The strain gages 18 and 19 may be of any suitable semiconductor types such as the piezo-resistive type strain gages which effects a change of electrical resistance when a tensile or compressive stress is applied thereto. The strain gages on one side of the leaf spring is under compression and the strain gage on the opposite side of the leaf spring is under tension when the spring section flexes and the change in resistance of the strain gages is a measure of the flexure of the spring section.

While the embodiment shown and described uses similar strain gages of either positive or negative gage factor on opposite sides of a spring section so that one strain gage is in compression and the other strain gage is in tension, it should be understood that strain gages having positive and negative gage factors may also be used. With this arrangement the positive and negative factor strain gages will be mounted on the same side of a spring section so that both strain gages are under tension or compression, depending upon the direction of flex of the spring section. The resistance of one strain gage will increase and the resistance of the other strain gage will decrease to provide a differential output from a conventional bridge circuit in which the strain gages are connected.

As explained in the copending U.S. application 616,067, filed Feb. 14, 1967, by Raymond D. Palfreyman, a Wheatstone bridge having an input source of an alternating voltage may be provided including piezo-resistive strain gages 18 mounted on opposite sides of the single rectangular leaf spring 21 and electrically connected in the bridge circuit in a balanced configuration with two resistors. A similar bridge circuit is provided for strain gages 19 mounted on the rectangular leaf spring 22. In the balanced configuration the rectangular leaf springs 21 and 22 are not flexed whereupon the output voltage from the controlled bridge circuits will be zero. However, upon the leaf springs 21 or 22 being flexed in response to an applied control force in a roll or pitch sense, respectively, there will be applied at the outputs of the controlled bridge circuits an alternating current signal of a phase dependent upon the sense of the control force selectively applied to the leaf spring elements 21 or 22 in the roll or pitch senses, respectively, and of a magnitude proportional to the applied control force. The several resistor elements of the respective bridge circuits may be mounted on a panel assembly indicated generally by the numeral 25 to which there lead conductors from the controlling piezo-resistor strain gages 18 and 19 and from which there may lead appropriate output conductors, as well as electrical energizing conductors indicated generally by the numeral 30 of FIGURE 2.

The outputs from the bridge circuits thus controlled by the semiconductor strain gages 18 and 19 are electrically included in the control system of FIGURE 1 so that upon a force being applied to the manual control wheel 7 less than that required to overcome the operation of the elevator or aileron servo motors 10 and 15, there is developed a signal proportional to this force and in a sense or electrical phase depending upon the direction of the application of force.

The developed signal is then applied through the appropriate output conductors 30 and a pitch setting channel conduit 23 or a roll setting channel conduit 24, as the case may be, and to either or both of the pair of low pass filters 26 and 28 and through conduits 27 and 29 leading from these filters to the automatic pilot control system 6 to vary the setting of the automatic pilot system, as described in the aforenoted U.S. Reissue Patent 25,356 and in the U.S. Patent No. 3,119,580. As explained therein, the low pass filters 26 and 28 are provided so that the inertia of the pilot's hand and the spring rate of the control wheel 7 will not form an oscillating system in varying the setting of the automatic pilot system 6.

Figure 2:
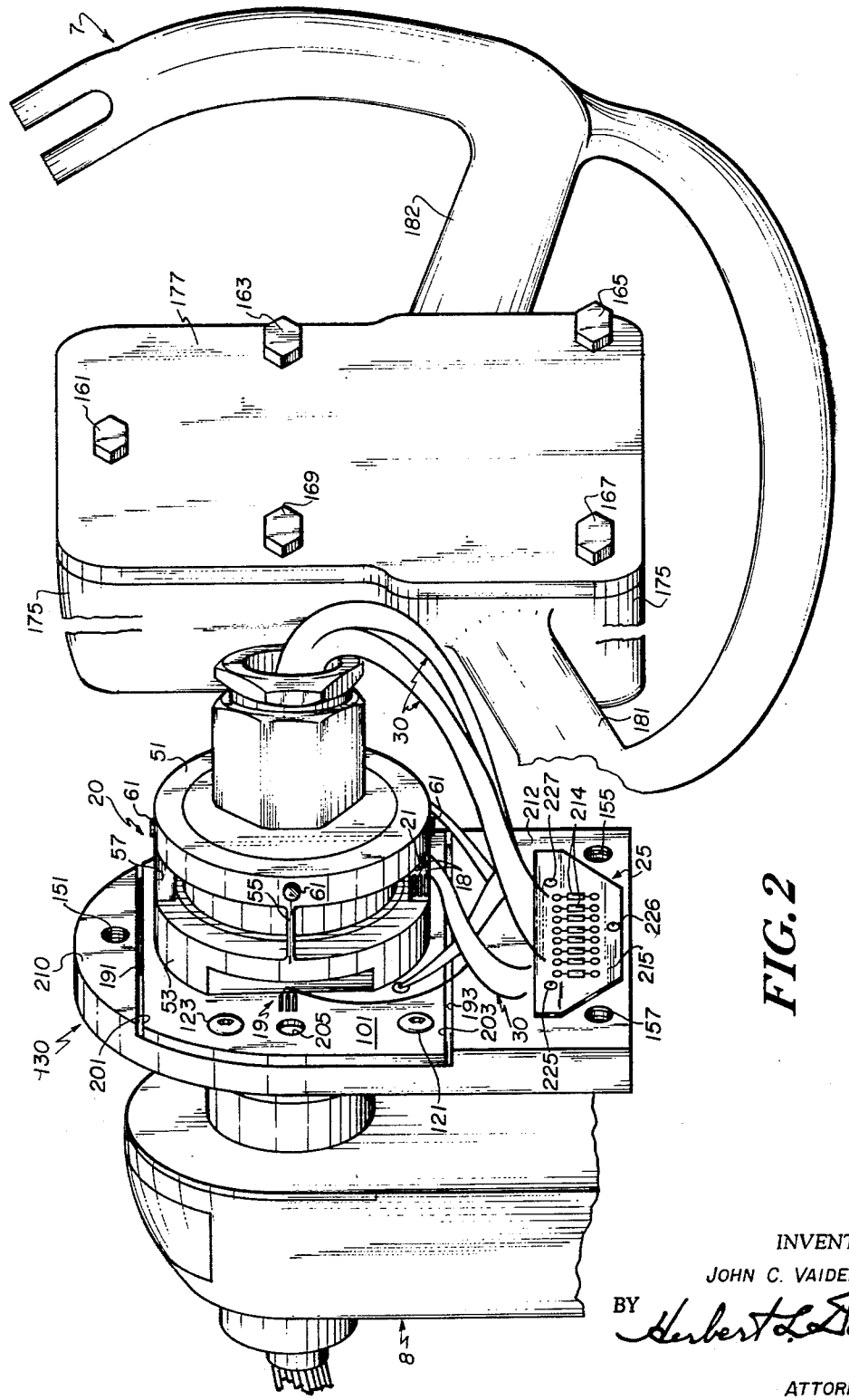
FIGURE 2 is an exploded perspective view of a control wheel constructed according to the present invention.
Figure 3:
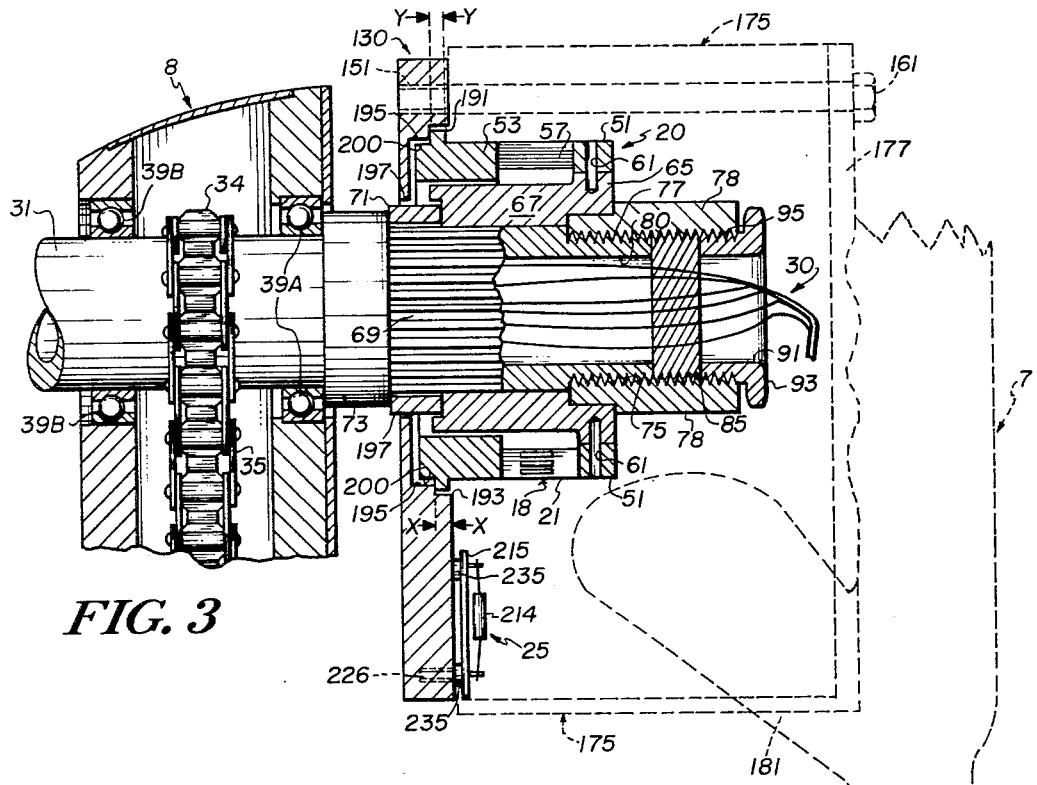
FIGURE 3 is a fragmentary horizontal sectional view taken through a hub force sensor embodying the present invention, with a fragment of the control wheel shown by dotted lines and illustrating the arrangement of the strain gages on one side of a rectangular leaf spring which deflects torsionally in response to applied roll control forces.
Figure 4:
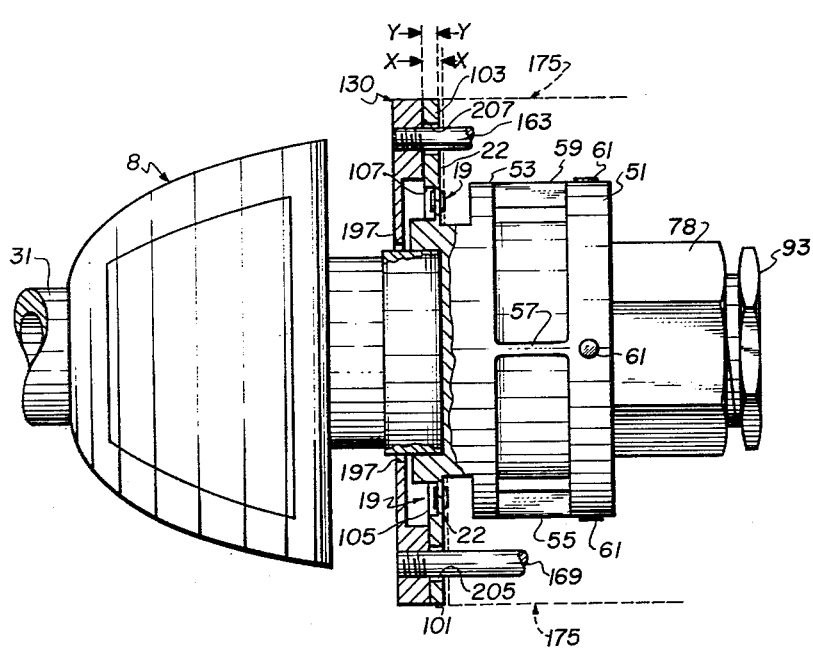
FIGURE 4 is a fragmentary top plan sectional view of the hub force sensor with the control wheel removed and illustrating the arrangement of the strain gages on opposite sides of other rectangular leaf springs which deflect axially in response to applied pitch control forces.

The improved control wheel 7 forming the subject matter of the present invention is shown in detail in FIGURES 2, 3 and 4 and includes an improved hub force sensor or force sensing mechanism 20 so that the human pilot of the aircraft may, by applying normal control forces to the wheel 7, maneuver the aircraft while it is on automatic control.

In the aforenoted arrangement the control wheel 7 is yieldably coupled through the novel hub force sensor 20 to a steering shaft 31. The shaft 31 is rotatably mounted in the column 8 by roller bearings 39A and 39B, as shown by FIGURE 3. There is affixed to shaft 31 a sprocket 34 over which a sprocket chain 35 passes in operative relation. The chain 35 is in turn drivingly connected to a second sprocket 37 which in turn is operatively connected so as to actuate in a conventional manner a mechanical linkage 40, while the column 8 is pivotally mounted in a conventional manner so as to actuate a mechanical linkage 42, as shown schematically by FIGURE 1.

Thus upon appropriate forces being exerted on the steering wheel 7 in an angular sense, the applied force may be transmitted through the steering shaft 31, sprocket 34, chain 35 and sprocket 37 to actuate the linkage 40 to effectively operate, as shown schematically in the drawing of FIGURE 1, the controller 10 for the ailerons 9, while upon appropriate forces being exerted on the steering wheel 7 in a fore or aft sense the applied force may be transmitted by pivotal movement of the column 8 to actuate the linkage 42 to effectively operate the controller 15 for the elevators 11.

The arrangement is such that the control wheel 7, as shown by FIGURE 3, is yieldably coupled to the steering shaft 31 through the novel hub force sensor 20 which includes two ring members 51 and 53 operably connected by four identical radial rectangular leaf spring elements 21, 55, 57 and 59, as shown by FIGURE 8. The rectangular leaf spring elements 21, 55, 57 and 58 extend longitudinally between the two ring members 51 and 53 with the spring element 21 positioned immediately below and on a line extending vertically through the center of the shaft 31, while the radial rectangular leaf spring elements 55, 57 and 59 are positioned in spaced relation 90°, 180° and 270° respectively, from the lower radial rectangular leaf spring element 21. Further the ring 51 is fastened to an annular flange portion 65, as shown by FIGURE 3, formed at one end of a splined adapter 67 by pins 61, as shown by FIGURES 2, 3 and 4, positioned in holes 63 provided in the ring 51, as shown by FIGURES 6 and 7.

The splined adapter 67, as shown by FIGURE 3, is operably engaged with a splined portion 69 of the shaft 31, while an annular bushing 71 is freely mounted on the splined portion 69 and positioned between an inner end of the splined adapter 67 and an annular flange portion 73 of the shaft 31. The annular flange portion 73 is positioned between the bushing 71 and an inner race of the roller bearing 39A rotatably mounting the steering shaft 31 in the column 8. An inner end portion of the shaft 31 is externally screw threaded at 75 and screw threadedly engaged by internal screw threads 77 provided within a nut 78 which in turn bears upon an outer end of the splined adapter 67 so as to lock the same in position on the spline portion 69 of the shaft 31.

The shaft 31 has a channel 80 extending longitudinally therethrough. Further abutting the inner end of the shaft 31 is a member 85 formed of a suitable electrical insulating material for carrying therethrough a multitude of electrically insulated conductors 30 leading to and from the several bridge circuits controlled by the roll and pitch semiconductors strain gages 18 and 19 and having certain of the resistor elements at the panel 25, as heretofore explained. The conductors 30 lead through an opening 91 provided in a second fastening nut 93 having external screw threads 95 engageable in the internal screw threads 77 provided within the nut 78. The nut 93 is arranged to be tightened into abutting relation with a side surface of the insulating member 85 so as to force an opposite side surface of the member 85 into an abutting relation with the outer end surface of the shaft 31, as shown in FIGURE 3. The conductors 30 pass internally through the channel 80 in the shaft 31 to the aircraft control system through the output conduits 23 and 24 leading therefrom, as heretofore explained with reference to FIGURE 1.

Further projecting from opposite side surfaces of the ring 52 are flange portions 101 and 103, as shown by FIGURES 2, 4, 5, 7 and 8. Further extending longitudinally in the flange portions 101 and 103 in orthogonal relation to the axis of the shaft 31 are parallel channels 105 and 107, as best shown by FIGURES 5 and 7, forming in the flange portions 101 and 103 two reduced thickness sections 22 which function as rectangular leaf springs extending in orthogonal relation to the axis of rotation of the shaft 31.

Figure 10:
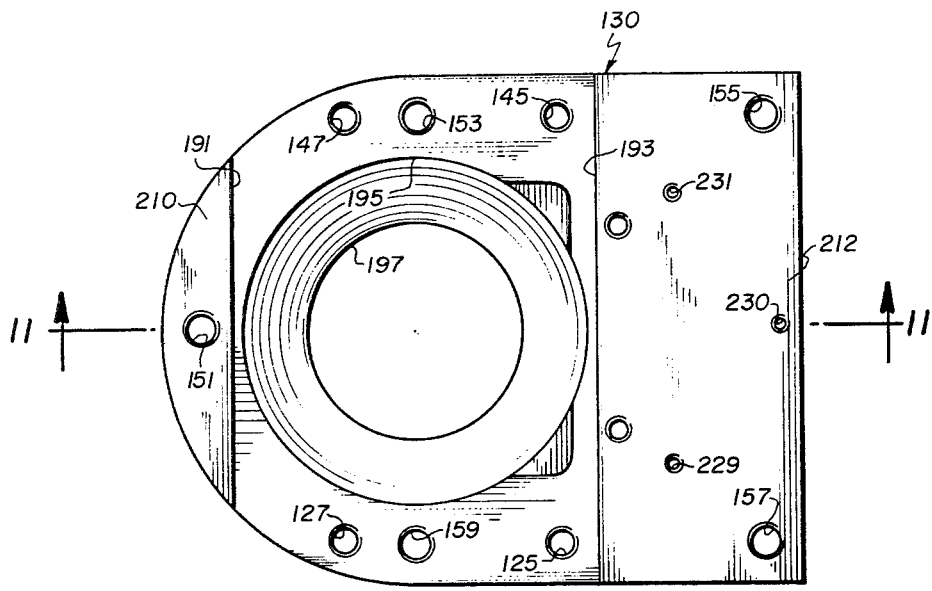
FIGURE 10 is an end view of a plate to support the control wheel in an operative relation to flanged sections projecting from opposite sides of a control force input ring of the hub force sensor as shown by FIGURES 2, 3 and 4.

An outer end portion of the flange 101 beyond the reduced thickness spring section 22 has provided therein suitable openings 111 and 113 having tapered recessed portions 115 and 117 provided in the side surface of the flange 101 opposite from that in which there is provided the channel 105. The tapered recessed portions 115 and 117 are arranged to receive correspondingly tapered heads of fastening bolts 121 and 123, as shown by FIGURE 2, which in turn have screw threaded stem portions to be threadedly engaged in corresponding screw threaded openings 125 and 127 formed in a supporting plate 130 of the control wheel 7, as shown in FIGURE 10.

The opposite outer end portion of the flange 103 beyond the reduced thickness spring section 22 has provided therein suitable openings 131 and 133 having tapered recessed portions 135 and 137 provided in the side surface of the flange 103 opposite from that in which there is provided the channel 107. The tapered recessed portions 135 and 137 are arranged to receive corresponding tapered heads of fastening bolts similar to the bolts 121 and 123, shown in FIGURE 2, and having screw threaded stem portions to be threadedly engaged in corresponding screw threaded openings 145 and 147 formed in the supporting plate 130, as shown in FIGURE 10.

Further there are provided in the supporting plate 130, additional screw threaded openings 151, 153, 155, 157 and 159 for receiving in screw threaded engagement therein screw threaded stem portions of respective fastening bolts 161, 163, 165, 167 and 169 for securing to the supporting plate 130 a hub portion 175 of the control wheel 7 having an end plate 177. There projects from the hub portion 175 spokes 181 and 182 of the control wheel 7.

Further the supporting plate 130 has a recessed portion provided therein defined by the parallel extending wall surfaces 191 and 193, as shown by FIGURES 2, 3 and 10 and 11, and an annular recessed defined by an annular wall surface 195, together with an annular opening 197 concentric with the annular recessed defined by the wall surface 195. The annular opening 197 in the supporting plate 130 is arranged to receive the annular bushing 71 through which projects the shaft 31, while the ring 53 of the hub 20 has an inner annular portion 200 positioned in the annular recess defined by the wall 195. Further the flange portions 101 and 103 projecting from the opposite sides of the ring 53 are received in the recessed portion of the supporting plate 130 defined by the parallel wall surfaces 191 and 193 with parallel upper and lower edge surfaces of the flange portions 101 and 103, indicated by the numerals 201 and 203 of FIGURE 2, positioned in spaced relation to the parallel wall surfaces 191 and 193 of the supporting plate 130.

Moreover, as best shown in FIGURES 2, 4, 5 and 8, there are provided in the flange portions 101 and 103 openings 205 and 207, respectively, of a somewhat larger diameter than the stem portions of the respective fastening bolts 169 and 163 so as to permit the stem portions of the bolts to pass freely through the respective openings 205 and 207 in the opposite end portions of the flanges 101 and 103 for securing the hub portion 175 of the control wheel 7 directly to the supporting plate 130 and free of the opposite end portions of the flanges 101 and 103 which project from the opposite sides of the ring 53.

It will be seen from the foregoing arrangement, that while the hub portion 175 of the control wheel 7 is secured by bolts 161 directly to an upper portion 210 of the supporting plate 130 and by securing bolts 165 and 167 directly to a lower portion 212 of the supporting plate 130, the hub portion 175 of the control wheel 7 is not secured to the flange portions 101 and 103 projecting from the opposite sides of the ring 53, but instead the bolts 169 and 163 extend freely through the openings 205 and 207, respectively, in the end portions of the flanges 101 and 103. Thus the bolts 169 and 163 provide elements for actuating the supporting plate 130 relative to the ring member 53 causing flexure of the flange portions 101 and 103 at the rectangular leaf springs or reduced thickness spring sections 22 upon an axial force being applied to the control wheel 7 in either a fore or aft sense.

Figure 11:
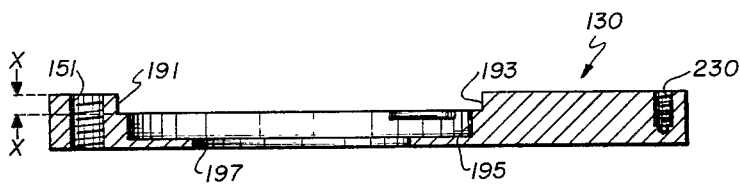
FIGURE 11 is a sectional view taken along the lines 11—11 of FIGURE 10 and looking in the direction of the arrows.

Moreover, the depth of the recess provided in the supporting plate 130 and indicated by the dash lines X—X of FIGURES 3, 4 and 11 is critical in that it is slightly greater than the width of the flanges 101 and 103 indicated by the dash lines Y—Y of FIGURES 3, 4 and 7 so that the hub portion 175 of the control wheel 7 does not bear at its inner end on the flanges 101 and 103, but instead bears upon the surfaces of the upper and lower end portions 210 and 212 of the supporting plate 130.

The depth X—X of the recess in the supporting plate 130 defined by the parallel side walls 191 and 193 may, for example, be .1255 of an inch, while the width Y—Y of the flange portions 101 and 103 projecting from the opposite sides of the ring 53 may, for example, be .1245 of an inch and thus somewhat less than the depth X—X of the recess.

However, while the hub portion 175 of the control wheel 7 is not connected directly to the flanges 101 and 103 at the outer end portions thereof, the supporting plate 130 is directly connected to the opposite outer end portions of the flanges 101 and 103 beyond the reduced thickness leaf spring portions 22 through the fastening bolts corresponding to the bolts 121 and 123 of FIGURE 2.

Thus upon an axial force being aplied to the control wheel 7 in either a fore or aft sense the resulting force applied through the bolts 163 and 169 to the supporting plate 130 will in turn cause the flanges 101 and 103 attached to the supporting plate 130 at the outer end portions thereof beyond the channels 105 and 107 to cause the reduced thickness leaf spring sections 22 thereof to act as rectangular leaf springs.

Thus since the outer end portions of the flanges 101 and 103 are interconnected by the supporting plate 130 through the fastening bolts 121 and 123 the spring section 22 in the flange 101 deflects in conjunction with the spring section 22 in the flange 103.

If equal forces are applied each of the springs 22 deflect equally in the same direction, while on the other hand if a force is applied to the rectangular spring 22 of one flange portion 101, for example, the rectangular spring 22 of the opposite flange portion 103, for example, will deflect to a lesser amount in the opposite direction. This difference in deflection is in proportion to the applied force (while the magnitude varies as a function of the moment arm).

Both of the springs 22 of the flanges 101 and 103 are instrumented by semiconductor strain gages 19 affixed at opposite sides of each of the leaf springs 22 by a suitable epoxy or plastic material and electrically interconnected into suitable electrical bridge circuits at the panel assembly 25 which combines the signals to indicate the differences in strain. The gages 19 are placed on each side of the springs 22 to offset apparent strains from temperature changes and tensile strains due to restraints. Furthermore, the proportions of the springs 22 are so chosen that there is negligible response to forces about axes other than the pitch axis and the gages 19 are located in the neutral axis of twisting modes of deflection.

The two rings 51 and 53 are connected together by the four rectangular radial leaf springs 21, 55, 57 and 59 so that the rotation of one ring 51 relative to the other ring 53 deflects the rectangular radial leaf springs 21, 55, 57 and 59 in bending. One of the four springs, for example, the spring 21 is instrumented on each side by the semiconductor strain gages 18 affixed at opposite sides of the rectangular radial leaf spring 21 by a suitable epoxy or plastic material and electrically interconnected into suitable electrical bridge circuits provided by resistor elements 214 of the panel assembly 25 which combine the signals to indicate the difference in strain. The latter arrangement of the strain gages 18 on the radial leaf spring 21 is such that axial strains cancel out, but roll or bending strains augment. Thus the gages 18 on spring 21 are responsive to roll forces only—axial strains from pitch forces and pitch moments and apparent strains from temperature changes are self-cancelling.

While the ring 51 is fastened to a splined adapter 61 which then is secured to the steering shaft 31 in the control column 8, the other ring 53 is flanged at 101 and 103 to be received in the supporting plate 130 which has the hub portion 175 of the control wheel 7 secured thereto by the fastening bolts 161, 163, 165, 167 and 169 as heretofore explained.

It will be further noted that, as explained in the aforenoted copending U.S. application Ser. No. 616,067, the piezo-resistive or semiconductor strain gages 18 and 19 may be triplicated as shown so as to provide desirable redundancy in effecting triplicated electrical outputs to suitable bridge circuits provided by the resistor elements 214 of the panel assembly 25 in both the pitch axis and in the roll axis in response to mechanical forces applied to these axes. The hub force sensor 20 is mounted on the steering shaft 31 of the control column 8, as shown by FIGURES 1 and 2, and accepts the control wheel 7 so as to respond to the forces applied, respectively, to the pitch and roll axes.

The hub force sensor 20 includes the rectangular radial leaf springs 21, 55, 57 and 59 which deflect torsionally in response to roll forces and the rectangular leaf springs 22 which deflect axially in response to pitch forces. Attached to the respective rectangular leaf springs 21 and 22 are semiconductor strain gages 18 and 19 with piezoresistive characteristics so that small changes in strain cause large changes in resistance. The gages are connected into the resistor elements 214 at the panel assembly 25 so as to provide Wheatstone bridges which yield the final desired result—electrical signals corresponding to the force inputs applied in the roll and pitch senses.

The novel hub force sensor 20 is mounted on an internally splined sleeve 67 which, in turn, mounts on the cantilever steering shaft 31 of the control wheel column 8. One end of the radial leaf spring 21 is rigidly attached to the shaft 31 while the other is free to move within prescribed limits. The control wheel 7 attaches to the free end of both the roll responsive rectangular leaf spring 21, as well as the pitch responsive rectangular leaf spring 22 through the supporting plate 130. Suitable electrical conductors 30 from the strain gages 18 and 19 responsive to the applied roll and pitch controlling forces pass to the bridge resistor elements 214 at the panel assembly 25 and therefrom through the longitudinal channel 80 in the shaft 31. The conductors 30 are fastened securely so that flexing of the electrical conductors 30, which are suitably insulated, do not influence the deflection of the spring elements 21 and 22.

The panel assembly 25, as shown by FIGURES 2 and 3, includes a board 215 of a suitable insulating material on which are mounted the resistor elements 214 providing the respective Wheatstone bridge circuits. The insulating board 215 is secured by the bolts 225, 226 and 227 to the lower portion 212 of the supporting plate 130. The bolts 225, 226 and 227 have screw threaded stem portions engageable, respectively, in suitable screw threaded holes 229, 230 and 231 provided in the lower portion 212 of the supporting plate 130, as shown by FIGURE 10, while suitable insulator washers 235 are positioned about stem portions of the bolts 225, 226 and 227 and between the insulating board 215 and the surface of the lower portion 212 of the supporting plate 130, as shown by FIGURE 3.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use in a steering system of a type including a control column mounted to move about a first axis, a steering shaft rotatably mounted in said column and movable about a second axis, and an operator-operative control element having a hub member coaxially arranged with respect to said steering shaft; a force sensor for operatively connecting the hub member to the steering shaft and through the steering shaft to said control column, the force sensor comprising a first spring section adapted to flex upon a force being applied to the control element in a first sense to axially bias the steering shaft and thereby the control column about the first axis, a second spring section adapted to flex a force being applied to the control element in a second sense to bias the steering shaft about the second axis, the first and second spring sections being spaced one from the other and extending along axes orthogonal to the second and first axes respectively; and semiconductor stress sensor means mounted on each of said spring sections and responsive to flexure of the associated spring section to effect electrical signals corresponding to the biasing force appled to the control element in said first and second senses.

2. The force sensor defined by claim 1 in which said first spring section includes a pair of leaf springs extending along an axis orthogonal to said second axis and positioned at opposite sides of said second axis, said second spring section includes a plurality of leaf springs extending radially of said second axis in spaced relation along axes orthogonal to said first axis, the leaf springs of said first and second sections operatively connecting the hub member of the control element to the steering shaft and control column, the leaf springs of the first section being adapted to flex upon a force being applied to the control element in said first sense, the leaf springs of the second section being adapted to flex upon a force being applied to the control element in said second sense, and the semiconductor stress sensor means of the first and second spring sections being mounted on the associated leaf springs to effect electrical signals corresponding to the biasing force applied to the control element in said first and second senses.

3. The force sensor defined by claim 2 in which the pair of leaf springs of the first spring section may be selectively flexed upon a greater force being applied in said first sense at one side of said control element than at an opposite side of said control element with the leaf spring at said one side flexing in one sense and the other leaf spring of said first spring section at the opposite side of said control element flexing in an opposite sense from the leaf spring at said one side in response to the greater force applied in said first sense at the one side of said operator-operative control element.

4. The force sensor defined by claim 1 including a pair of ring members arranged in coaxial relation to the steering shaft, means connecting one of the ring members to the steering shaft, the second spring section including rectangular leaf springs connecting the other ring member to said one ring member, means for connecting the operator-operative control element to said other ring member to cause the rectangular leaf springs of said second spring section to flex upon a force being applied to the control element in said second sense to bias the steering shaft about said second axis, and at least one of said rectangular leaf springs having the semiconductor stress sensor means of said second spring section mounted thereon and responsive to flexure of the associated rectangular leaf spring to effect an electrical signal corresponding to the biasing force applied to the operator-operative control element in said second sense.

5. The force sensor defined by claim 1 including a pair of ring members arranged in coaxial relation to the steering shaft, means for connecting one of the ring members to the steering shaft, the second spring section connecting the other ring member to said one ring member, a pair of flange elements projecting from opposite sides of said other ring member, the first spring section including a rectangular leaf spring positioned in each of said flange elements intermediate said other ring member and opposite end portions of said flange elements, a plate for supporting said flange elements so as to permit flexure of the flange elements therein at said rectangular leaf springs, means operatively connecting said supporting plate to said opposite end portions of said flange elements, other means for connecting the hub member of the operator-operative control element to said supporting plate so as to cause the rectangular leaf springs of said first spring section to flex upon a force being applied to the control element in said first sense to axially bias the steering shaft and thereby the control column about the first axis, and each of said rectangular leaf springs having the semiconductor stress sensor means of the first spring section mounted thereon and responsive to flexure of the associated rectangular leaf spring to effect an electrical signal corresponding to the biasing force applied to the control element in said first sense.

6. The force sensor defined by claim 5 in which the second spring section includes a plurality of rectangular leaf springs connecting the other ring member to said one ring member, the pair of flange elements projecting from opposite sides of said other ring member and the supporting plate operatively connected to said opposite end portions of the flange elements for directly connecting the hub member of the operator-operative control element to said other ring member to cause the rectangular leaf springs of said second spring section to flex upon a force being applied to the control element in said second sense so as to bias the steering shaft about said second axis, and at least one of said last mentioned rectangular leaf springs having the semiconductor stress sensor means of said second spring section mounted thereon and responsive to flexure of the associated rectangular leaf spring to effect an electrical signal corresponding to the biasing force applied to the operator-operative control element in said second sense.

7. The force sensor defined by claim 5 in which the supporting plate includes a recess having a depth sufficient to receive therein the flange elements projecting from the opposite sides of said other ring member, and said flange elements being of a thickness slightly less than the depth of said recess so as to permit the flexure of the flange elements therein at said rectangular leaf springs.

8. The force sensor defined by claim 7 in which said other means for connecting said operator-operative control element to said supporting plate includes actuating elements projecting from said supporting plate for connecting thereto the hub member of the operator-operative control element, said actuating elements projecting freely through the flange elements so as to actuate the supporting plate axially relative to the other ring member and thereby cause the rectangular leaf springs of said first spring section to flex upon a force being applied to the control element in said first sense to axially bias the steering shaft and thereby the control column about the first axis.

9. The force sensor defined by claim 8 in which said actuating elements include a pair of actuating rods projecting in spaced relation from the supporting plate, one of the actuating rods projecting freely through one of said flange elements and the other of the actuating rods projecting freely through the other of said flange elements, said actuating rods being so arranged for connecting the hub member of the operator-operative control element to the supporting plate so that the rectangular leaf springs of the first spring section may be selectively flexed upon a greater force being applied at one side of said operator-operative control element in said first sense than at an opposite side of said operator-operative control element, whereupon the rectangular leaf spring of said first spring section at said one side may flex in one sense and the rectangular leaf spring of said first spring section at the opposite side of said control element may flex in an opposite sense in response to the greater force applied in said first sense at the one side of said operator-operative control element so as to cause the semiconductor stress sensor means on each of the rectangular leaf springs of the first spring section to effect a modified electrical signal in response to the greater biasing force applied to the one side of the control element in said one sense than at the opposite side.

10. The force sensor defined by claim 9 in which the second spring section includes a plurality of rectangular leaf springs connecting the other ring member to said one ring member, the pair of flange elements projecting from opposite sides of said other ring member and the supporting plate operatively connected to said opposite end portions of the flange elements for directly connecting the hub member of the operator-operative control element to said other ring member to cause the rectangular leaf springs of said second spring section to flex upon a force being applied to the control element in said second sense so as to bias the steering shaft about said second axis, and at least one of said last mentioned rectangular leaf springs having the semiconductor stress sensor means of said second spring section mounted thereon and responsive to flexure of the associated rectangular leaf spring to effect an electrical signal corresponding to the biasing force applied to the operator-operative control element in said second sense.

References Cited

UNITED STATES PATENTS

| | | | |
|---|---|---|---|
| 3,119,580 | 1/1964 | Murphy | 244—83 |
| 3,167,667 | 1/1965 | Lukso | 310—8.6 |
| 3,251,013 | 5/1966 | Klem et al. | 244—83 X |

ANDREW H. FARRELL, Primary Examiner

U.S. Cl. X.R.

310—8

FO-1050
(5/69)

UNITED STATES PATENT OFFICE
CERTIFICATE OF CORRECTION

Patent No. 3,473,760          Dated October 21, 1969

Inventor(s) John C. Vaiden

It is certified that error appears in the above-identified patent and that said Letters Patent are hereby corrected as shown below:

Claim 1, column 10, line 69, after "flex" insert -- upon --.

SIGNED AND SEALED

JUL 7 1970

(SEAL)
Attest:

Edward M. Fletcher, Jr.
Attesting Officer

WILLIAM E. SCHUYLER, JR.
Commissioner of Patents